(12) United States Patent
Tomita (10) Patent No.: US 7,747,149 B2
(45) Date of Patent: Jun. 29, 2010

(54) OPTICAL APPARATUS HAVING IMAGE-BLUR CORRECTION/REDUCTION SYSTEM

(75) Inventor: Chifuyu Tomita, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 421 days.

(21) Appl. No.: 11/444,732

(22) Filed: May 31, 2006

(65) Prior Publication Data
US 2006/0285839 A1  Dec. 21, 2006

(30) Foreign Application Priority Data
Jun. 20, 2005 (JP) ............................. 2005-178819

(51) Int. Cl.
*G03B 17/00* (2006.01)
(52) U.S. Cl. ................... 396/55; 348/208.11
(58) Field of Classification Search ............ 396/55; 348/208.11
See application file for complete search history.

(56) References Cited

U.S. PATENT DOCUMENTS

| | | | |
|---|---|---|---|
| 5,774,266 A | 6/1998 | Otani et al. | |
| 5,905,917 A * | 5/1999 | Imura | 396/55 |
| 6,064,827 A * | 5/2000 | Toyoda | 396/55 |
| 6,374,048 B1 * | 4/2002 | Uenaka et al. | 396/52 |
| 6,415,105 B1 * | 7/2002 | Sasaki et al. | 396/55 |
| 6,694,096 B1 * | 2/2004 | Imada | 396/52 |
| 2001/0016116 A1 * | 8/2001 | Sasaki et al. | 396/55 |
| 2002/0112543 A1 * | 8/2002 | Noguchi | 73/618 |

FOREIGN PATENT DOCUMENTS

JP        5-297443 A        11/1993

* cited by examiner

*Primary Examiner*—Melissa J Koval
*Assistant Examiner*—Fang-Chi Chang
(74) *Attorney, Agent, or Firm*—Canon U.S.A., Inc., IP Division (57) ABSTRACT

At least one exemplary embodiment is directed to an image-blur correction/reduction system miniaturized by arranging support guiding devices of a movable member and a rotation restricting device configured for restricting the rotation of the movable member about the optical axis so as to overlap each other viewed from the optical axial direction, a lens barrel, which can have the image-blur correction/reduction system, and an optical apparatus, which can have the same.

4 Claims, 12 Drawing Sheets

OPTICAL APPARATUS HAVING IMAGE-BLUR CORRECTION/REDUCTION SYSTEM

BACKGROUND OF THE INVENTION

1. Field of the Invention

The present invention relates to an image-blur correction/reduction system and an optical apparatus having the image-blur correction/reduction system.

2. Description of the Related Art

During handhold shooting, for preventing or reducing image blur due to camera shake, optical apparatuses (e.g., a digital camera, and a video camera) equipped with an image-blur correction/reduction system have been used.

The camera shake is detected by a shake detecting device so as to optically or electronically correct and/or reduce the camera shake corresponding to the detected result.

An optical image-blur correction/reduction system includes a scheme in that a correction lens held on a movable member is displaced in the yaw or the pitch direction so as to correct and/or reduce the camera shake.

For example, an image-blur correction/reduction system constructed as below is discussed in Japanese Patent Publication No. 3229899.

Three abutment parts abutting the movable member that moves on a plane perpendicular to the optical axis are provided on a base member.

Figure 12:
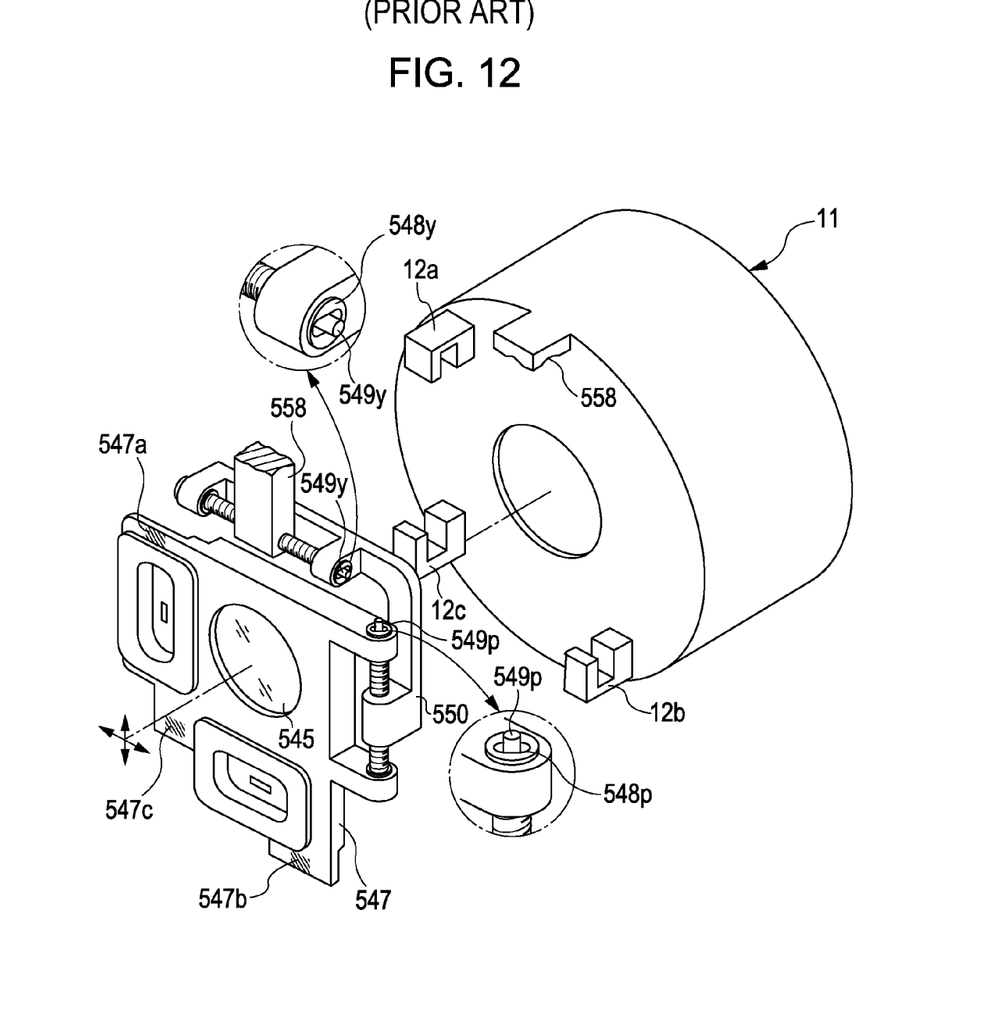
FIG. 12 is a drawing of a conventional image-blur correction/reduction system.

For restricting the position of the movable member in the optical axial direction with the three abutment parts while restricting the movable member from rotating about the optical axis by a rotation restricting device, a structure shown in FIG. 12 is adopted.

Referring to FIG. 12, reference numeral 11 denotes a support frame; numeral 545 a correction lens; numeral 547 a fixed frame; numeral 550 a first holding frame; and numeral 558 a part of a housing formed integrally with the support frame 11.

A pitch shaft 549p is for displacing the correction lens 545 in the pitch direction and a bearing 548p is the bearing of the pitch shaft 549p.

A yaw shaft 549y is for displacing the correction lens 545 in the yaw direction and a bearing 548y is the bearing of the yaw shaft 549y.

Three support parts 12a, 12b, and 12c, each of which can have a recess, are provided in the support frame 11.

These recesses are to be fitted to hatched protrusions 547a, 547b, and 547c of the fixed frame 547, respectively.

Thereby, the fixed frame 547 is surrounded by three points of the support parts 12a, 12b, and 12c so as to define the plane of the movable member including the correction lens, thereby precisely defining the moving direction and the inclination to the optical axis of the movable member.

Also, the first holding frame 550, the bearings 548p and 548y supported by the housing 558, the pitch shaft 549p, and the yaw shaft 549y, which are mentioned above, have functions of restricting the rotation of the movable member about the optical axis.

In the system discussed in Japanese Patent Publication No. 3229899, although the moving direction and the inclination to the optical axis of the movable member including the correction lens can be precisely defined, a problem can arise when a lens barrel is miniaturized.

That is, the three abutment parts for restricting the position of the movable member in the optical axial direction and the rotation restricting device configured for suppressing the rotation of the movable member about the optical axis can be arranged in different positions viewed from the optical axial direction, so that the miniaturization of the lens barrel in diameter is suppressed.

SUMMARY OF THE INVENTION

The present invention provides is directed to a support guiding device of a movable member configured for restricting the position of the movable member in the optical axial direction so as to guide the movable member in a plane direction perpendicular to the optical axis and a rotation restricting device configured for restricting the rotation of the movable member about the optical axis, which can be arranged so as to overlap each other viewed from the optical axial direction.

By the arrangement in such a manner, an image stabilizer and an optical apparatus, which can have the image stabilizer, can be miniaturized.

Further features of the present invention will become apparent from the following description of exemplary embodiments with reference to the attached drawings.

BRIEF DESCRIPTION OF THE DRAWINGS

FIGS. 6A and 6B are drawings illustrating the relationship between a ball and a shift base unit/a movable unit, in which

FIGS. 9A and 9B are drawings illustrating the movement direction of the L-shaped shaft according to the first exemplary embodiment, in which

DESCRIPTION OF THE EMBODIMENTS

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values should be interpreted to be illustrative only and non limiting. For example some members may be indicated as being fixed to other elements; however these members can be operatively connected to the elements as well. Thus, other examples of the exemplary embodiments could have different values.

Notice that similar reference numerals and letters refer to similar items in the following figures, and thus once an item is defined in one figure, it may not be discussed for following figures.

First Exemplary Embodiment

Figure 1:
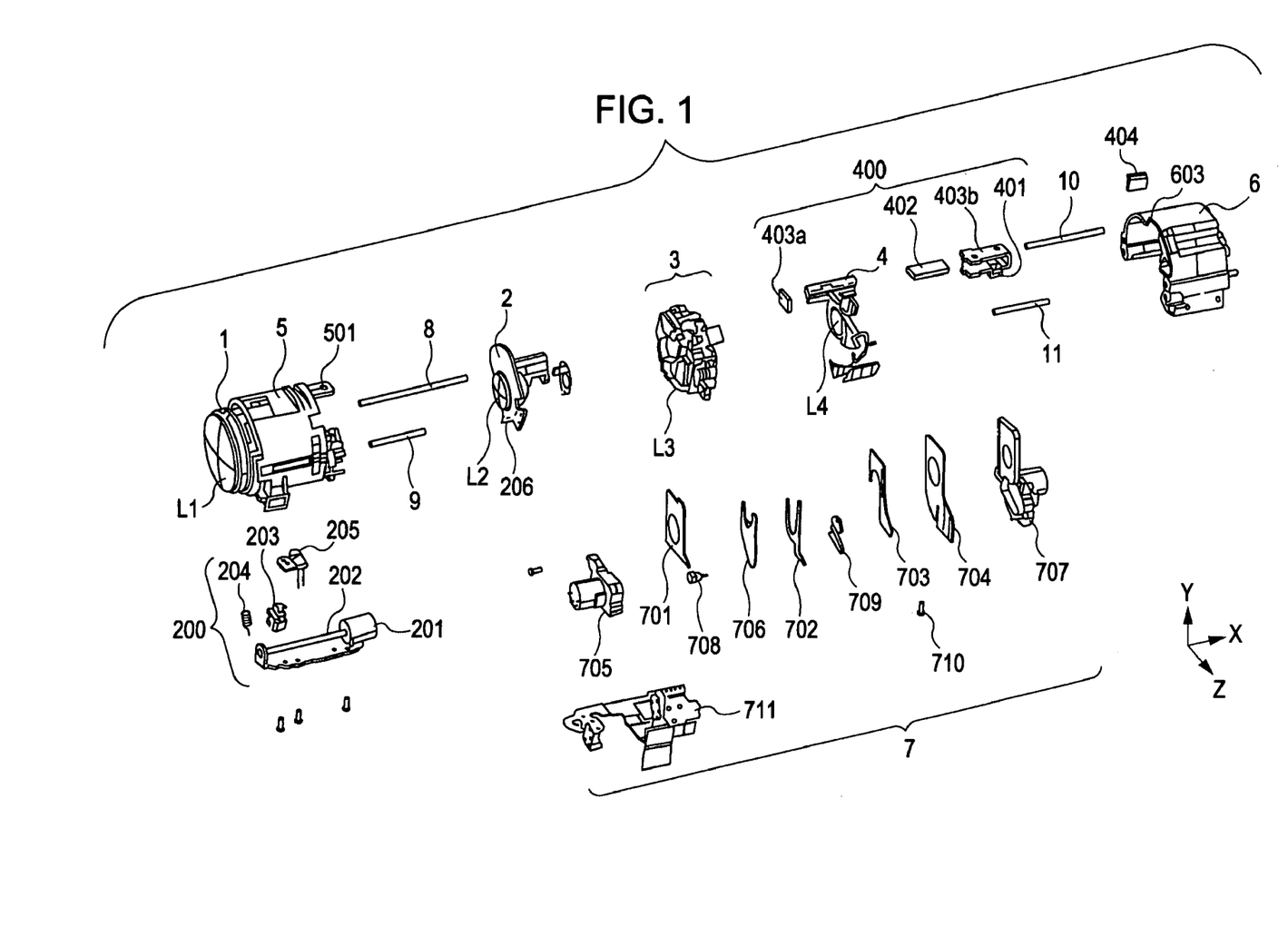
FIG. 1 is an exploded perspective view of a lens barrel according to a first exemplary embodiment.
Figure 2:
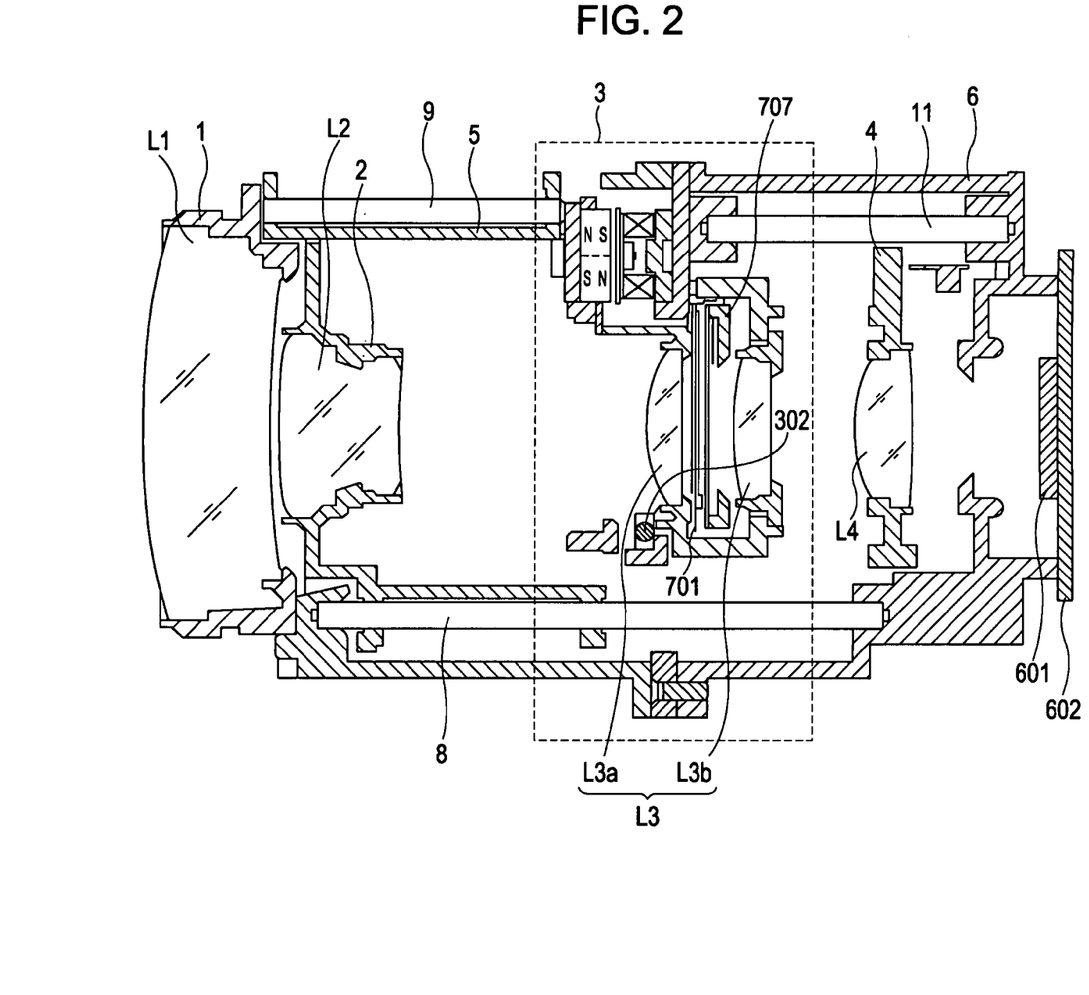
FIG. 2 is a sectional view of part of the lens barrel according to the first exemplary embodiment.

A first exemplary embodiment exemplifies a shift unit provided for correcting or reducing image blur in a third lens group of a lens barrel, which can have a four-group variable power optical system of convex-concavo-convex-convex first to fourth lens groups. First, the entire configuration of the lens barrel will be described with reference to FIGS. 1 and 2. FIG. 1 is an exploded perspective view of the lens barrel according to the embodiment; FIG. 2 is a sectional view of part of the lens barrel; and in these drawings, some shapes are omitted for the sake of description convenience.

Referring to FIGS. 1 and 2, reference character L1 denotes a fixed first lens group; character L2 a second lens group performing variation by moving in the optical axial direction; and character L3 a third lens group correcting or reducing image blur by moving on a plane perpendicular to the optical axis. The third lens group L3 includes a 3ath lens group L3a and a 3bth lens group L3b. Character L4 denotes a fourth lens group which can focus by moving in the optical axial direction. Also, reference numeral 1 represents a front-lens barrel holding the first lens group L1; numeral 2 a variable power movement frame holding the second lens group L2; numeral 3 a shift unit movable on a plane perpendicular to the optical axis; numeral 4 a focusing movement frame holding the fourth lens group L4; and numeral 5 a fixed barrel with the front end connected to the front-lens barrel (e.g., with three screws). Reference numeral 6 denotes a rear-lens barrel having an image-pickup element 601, such as a CCD or CMOS, fixed thereto; and numeral 602 an intermediate member for attaching the image-pickup element 601 to the rear-lens barrel 6.

The rear-lens barrel 6, which is positioned to the fixed barrel 5 and which can have the shift unit 3 caught therein, is fixed from the front side with two screws and one engagement part (an engaging claw 603 and an engaging hole 501). The intermediate member 602 is fixed to the rear-lens barrel 6 with screws after fixing the image-pickup element 601 thereto with an adhesive. The shift unit 3 is sandwiched between the fixed barrel 5 and the rear-lens barrel 6, and fixed from the front side with two screws. A light-amount adjustment unit 7 includes a press strip 701, two diaphragm blades 702 and 703, a partition strip 704, a diaphragm bottom board 705, an ND (neutral density) filter 706, an ND bottom board 707, a diaphragm arm 708, an ND arm 709, and screws 710, FPC (Flexible print circuit) 711. In the light-amount adjustment unit 7, by moving the two diaphragm blades 702 and 703 in opposition to each other on the plane perpendicular to the optical axis, an aperture is changed. The light-amount adjustment unit 7 is fixed to the shift unit 3 with the screws 710. The ND filter 706 having two-density parts can move back and forth independently of the diaphragm blades 702 and 703.

Both ends of a guide bar 8 are held by the fixed barrel 5 and the rear-lens barrel 6, respectively, and a guide bar 9 is pressed into the fixed barrel 5. Both ends of guide bars 10 and 11 are held by the rear-lens barrel 6 and the shift unit 3, respectively. The variable power movement frame 2 and the focusing movement frame 4 are supported by the guide bars 8 and 9 and the guide bars 10 and 11, respectively, movably in the optical axial direction. The variable power movement frame 2 and the focusing movement frame 4 are restricted from falling down in the optical axial direction by fitting into one guide bar with a sleeve, which can have a predetermined length in the optical axial direction, respectively. They are also restricted from rotating about the one guide bar by engaging the other guide bar with a U-shaped groove, respectively.

A stepping motor (also referred to as a zoom motor below) 200 moves the second lens group L2 in the optical axial direction as a variator, and it includes a rotor 201 and a coaxial lead screw 202, which is mated with a rack 203 provided in the variable power movement frame 2. By the rotation of the rotor 201 and the lead screw 202, the variable power movement frame 2 (the second lens group L2) is driven in the optical axial direction. The stepping motor 200 is fixed across the fixed barrel 5 and the rear-lens barrel 6 with two screws. With a helical torsion coil spring 204 arranged between the variable power movement frame 2 and the rack 203, the variable power movement frame 2 is urged toward the guide bars 8 and 9 in the radial direction of the guide bars while the rack 203 is urged toward the variable power movement frame 2 in the optical axial direction. Furthermore, the rack 203 is urged in the engaging direction with the lead screw 202.

A zoom reset switch 205 made of a photo-interrupter is for detecting the reference position of the second lens group L2 by electrically detecting the change in light exclusion/transmission due to the movement in the optical axial direction of a light-exclusion part 206 formed in the variable power movement frame 2. The zoom reset switch 205 is fixed to the fixed barrel 5 with screws. A focus motor (voice coil motor) 400 moves the fourth lens group L4 in the optical axial direction for focusing, and it includes a coil 401, a drive magnet 402, and two yokes 403a and 403b. By passing an electric current through the coil 401, a Lorentz force is generated due to the repulsion of magnetic lines against each other generated between the coil 401 and the magnet 402 so as to move the fourth lens group L4. The focusing movement frame 4 includes a sensor magnet (not shown) multipolarized in the optical axial direction. An MR sensor 404 is retained at a position of the fixed barrel 5 opposing the sensor magnet and the outside of the optical axis. A predetermined reference position of the fourth lens group L4 can be detected using the signal from the MR sensor 404.

Figure 3:
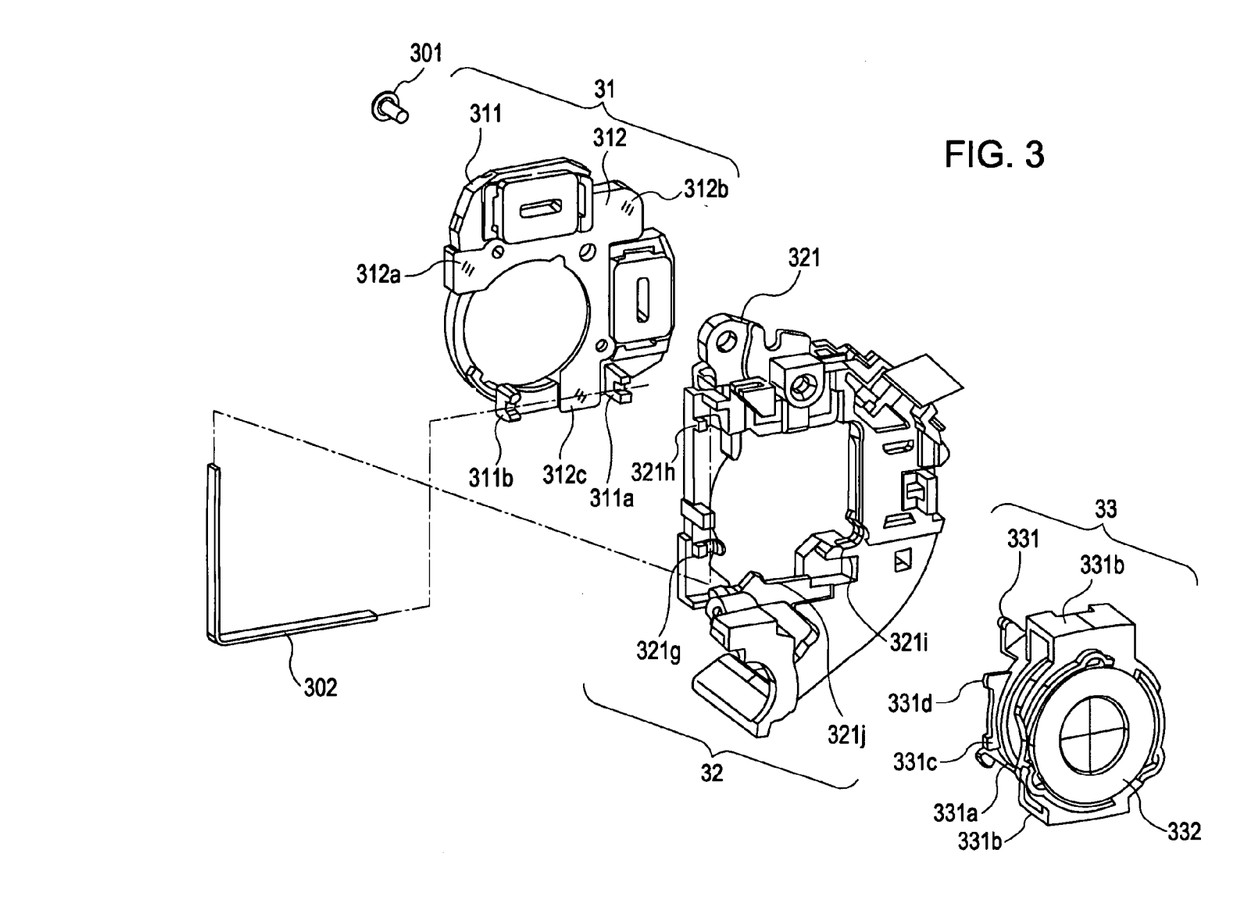
FIG. 3 is an exploded view of a shift unit according to the first exemplary embodiment viewed from the image plane.
Figure 4:
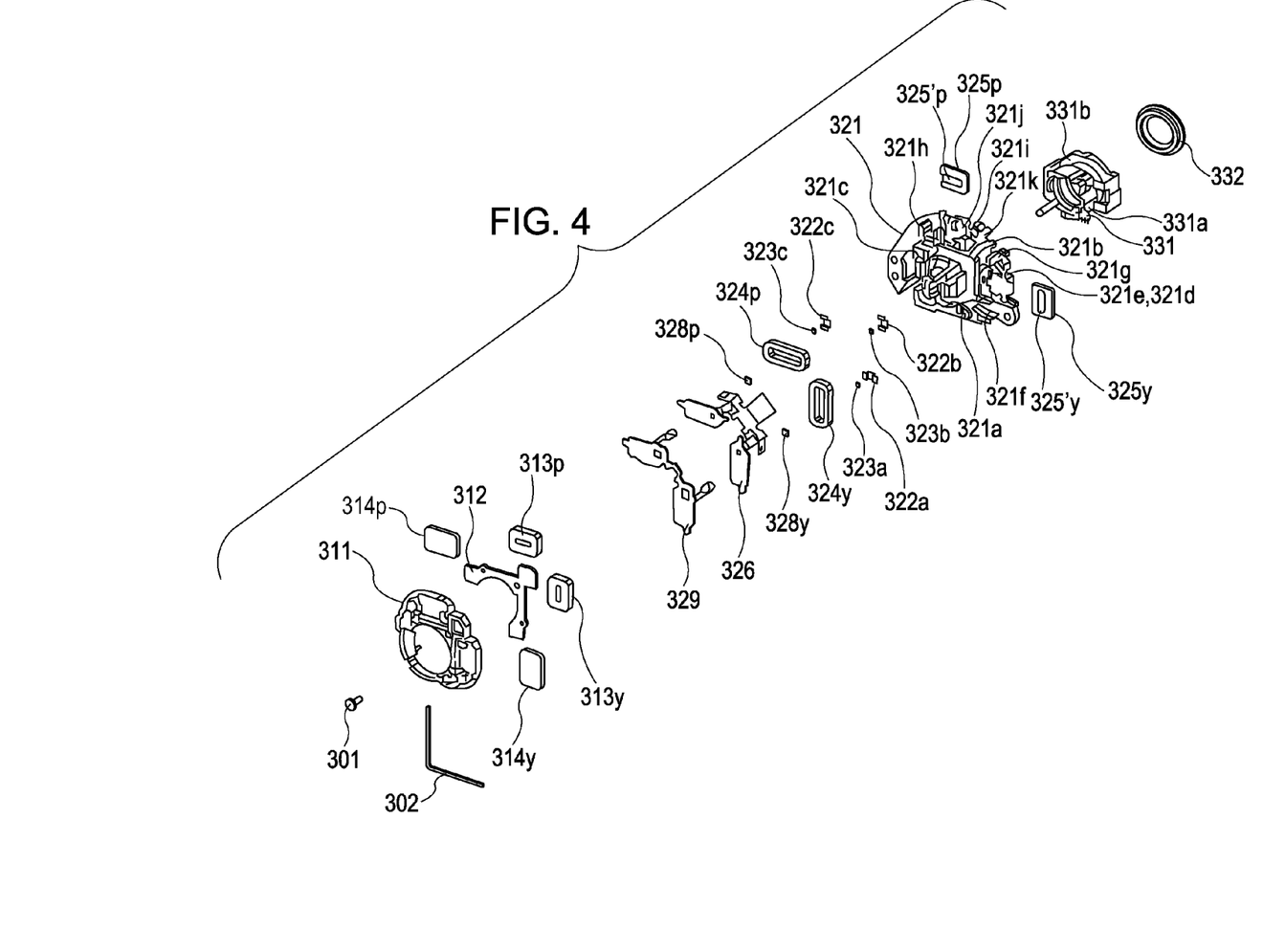
FIG. 4 is an exploded perspective view of the shift unit according to the first exemplary embodiment.
Figure 5:
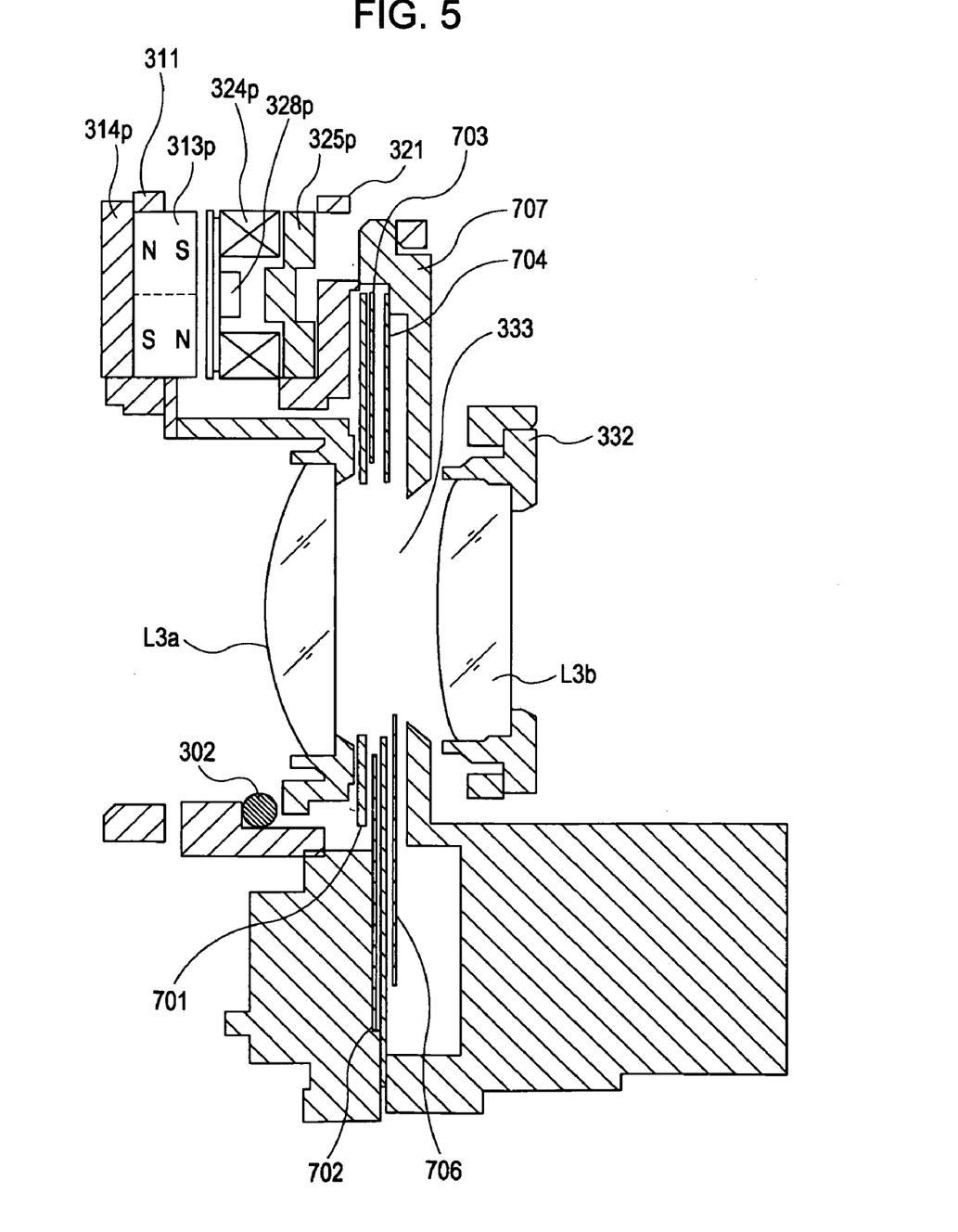
FIG. 5 is a sectional view of the shift unit and a light-amount adjustment unit according to the first exemplary embodiment.

Then, the configuration of the shift unit 3 will be described with reference to FIGS. 3 to 6B. FIG. 3 is an exploded view of the shift unit 3 viewed from the image plane; FIG. 4 is an exploded perspective view of the shift unit 3; and FIG. 5 is a sectional view of the shift unit 3 and the light-amount adjustment unit 7. The shift unit 3 includes a shift magnet unit 31, a shift base unit 32, and a shift movement frame unit 33. The shift base unit 32 is arranged between the shift magnet unit 31 and the shift movement frame unit 33. The shift magnet unit 31 and the shift movement frame unit 33 constitute a movable member by being integrated with screws 301 in this state (referred to as a movable unit 34 below when they are integrally expressed). The movable unit 34 is movable relative to the shift base unit 32 in the yaw direction or the pitch direction in the state holding the third lens group L3.

First and second shift barrels 331 and 332 constitute the shift movement frame unit. The first shift barrel 331 holds a 3 ath lens group L3a and the second shift barrel 332 holds a 3 bth lens group L3b. The first shift barrel 331 includes a lens holder 331a holding the 3 ath lens group L3a and a connection part 331b connecting the second shift barrel 332. The first shift barrel 331 and the second shift barrel 332 are fixed together (e.g., with an adhesive) after eliminating the relative eccentricity. The second shift barrel 332 is bonded to the connection part 331b of the first shift barrel 331. The space in the optical axial direction between the 3 ath lens group L3a and the 3 bth lens group L3b is constant. A magnet base 311 and a metallic plate 312 and magnet 314p and 314y constitute the shift magnet unit 31. The surface of the magnet base 311 adjacent to the image plane is in contact with the surface of the metallic plate 312 adjacent to the front lens in the optical axial direction. The suitable material for the metallic plate 312 can vary (e.g., stainless steel).

A shift base 321 is included in the shift base unit 32, and can be fixed by being clamped between the fixed barrel 5 and the rear-lens barrel 6. Metallic plates 322a to 322c are included in the shift base unit 32, and can be arranged in recesses 321a to 321c provided in the shift base 321, respectively. The suitable material for the metallic plates 322a to 322c can also vary (e.g., stainless steel). Three balls 323a to 323c are clamped between the metallic plates 322a to 322c and the metallic plate 312, respectively. These balls 323a to 323c are made of low magnetic reactive material (e.g., stainless steel) so as not to be attracted by a magnet arranged in the vicinity.

The three balls 323a to 323c abut the metallic plates 322a to 322c, respectively, and they further abut upper surfaces 312a to 312c of the metallic plate 312, respectively. The respective three abutment surfaces are roughly perpendicular to the optical axis of the optical system. When the diameters of the three balls 323a to 323c are the same, reducing the relative difference in position of the abutment surfaces in the optical axial direction enables the movable unit 34 to be held and shift-guided in the perpendicular direction to the optical axis. An L-shaped shaft 302 is formed by bending a cylindrical bar at about 90°, and is included in the rotation restricting device. The suitable material for the L-shaped shaft 302 can vary (e.g., stainless steel). The L-shaped shaft 302 is assembled into a support part provided in the magnet base 311 or the first shift barrel 331 after being assembled in the pitch direction into a support part provided the shift base 321 when the shift magnet unit 31 is integrated with the shift movement frame unit 33.

Then, the driving device of the shift unit 3 will be described. The driving device and the position detecting device in the pitch direction and the yaw direction can have the same configuration, and can have the phase difference of 90° about the optical axis. Hence, only the driving device in the pitch direction will be described herein and device in the yaw direction will not be described. In the drawings, the reference numerals in the pitch direction are attached by "p" while numerals in the yaw direction are attached by "y." A drive magnet 313p is radially bipolarized in the optical axial direction, and it also serves as a position detector. A back yoke 314p is for closing the magnetic flux of the magnet 313p adjacent to the front lens in the optical axial direction; numeral 324p denotes a coil; and a yoke 325p is for closing the magnetic flux of the magnet 313p adjacent to the image plane in the optical axial direction. The yoke 325p has substantially the same projection shape as that of the magnet 313p in the optical axial direction. Reference numeral 326 denotes a flexible print cable (referred to as an FPC below). The magnet 313p is positioned by being pressed into the magnet base 311; the back yoke 314p is assembled into the magnet base by sliding it in the optical axial direction; the coil 324p is fixed by being pressed into the shift base 321; and the yoke 325p is assembled into the shift base 321 by sliding it in the optical axial direction.

Also, the yoke 325p includes a projection 325'p formed by half blanking. The projection 325'p is spaced from both the magnetic poles of the bipolarized magnet 313p at substantially the same interval. Hence, the forces pulling the projection 325'p by both the magnetic poles are substantially the same so as to have a well-balanced state. Members 321d to 321k can be arranged in the shift base 321 for positioning the FPC 326. 329 is a fixing plate to fix FPC 326.

The FPC 326 is operatively connected to the shift base 321 by being assembled into the positioning members 321d to 321k and fixed by the fixing plate 329. The coil 324p and the yoke 325p are fixed to the shift base 321 while the magnet 313p and the back yoke 314p are fixed to the magnet base 311. Then, the magnet 313p, the back yoke 314p, and the yoke 325p form a magnetic circuit. When an electric current is passed through the coil 324p, the movable unit 34 is shifted in a direction substantially perpendicular to the polarization boundary of the bipolarized magnet 313p together with the magnet.

Since the driving device structured in such a manner are provided in the pitch direction and the yaw direction, driving forces can be applied in the pitch and yaw directions substantially perpendicular to each other on a plane perpendicular to the optical axis. That is, the exemplary embodiment has a so-called moving magnet driving device. By a magnetic attraction force generated between the magnet 313p and the yoke 325p, the yoke 325p is attracted toward the magnet 313p. That is, by arranging the balls so that the resultant force in the magnetic circuit in the pitch and yaw directions can be applied inside the balls 323a to 323c, the movable unit 34 can be urged toward the shift base 321.

Between the abutment surfaces of the three balls 323a to 323c, the metallic plates 322a to 322c, and the metallic plate 312, lubricating oil can be applied so as to reduce the chance of balls 323a to 323c from being easily displaced.

Figure 6A:
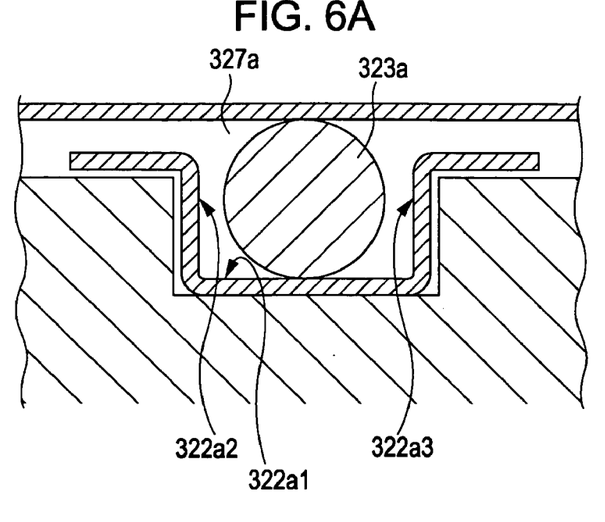
FIG. 6A is a schematic sectional view of the ball and its vicinity in the optical axial direction.
Figure 6B:
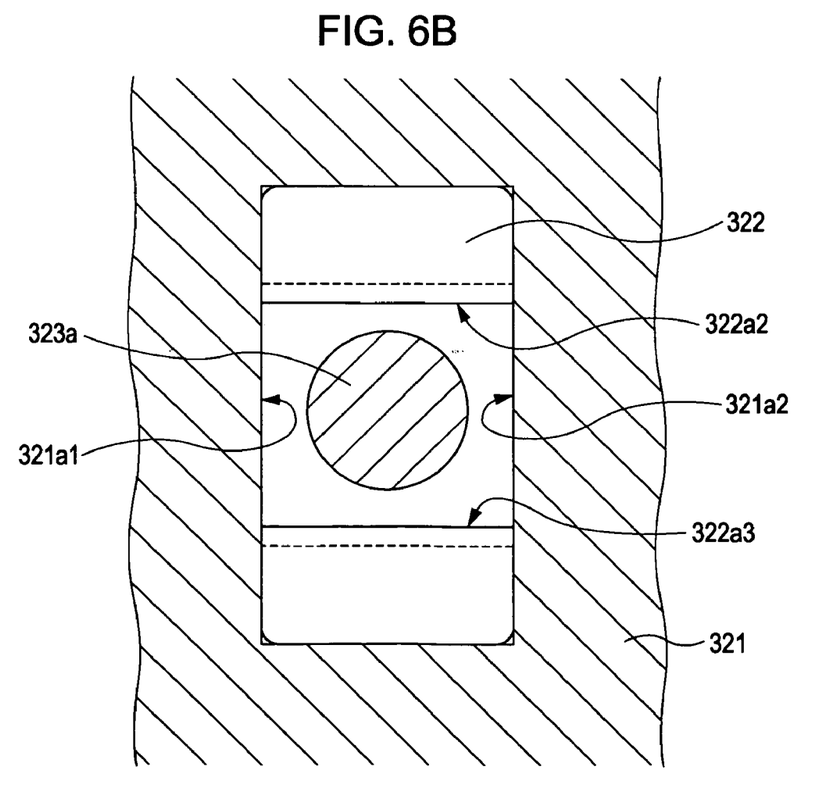
FIG. 6B is a schematic view of the ball and its vicinity viewed from the front lens.

Next, the relationship between the ball 323a and the shift base unit 32 and the movable unit 34 will be described with reference to FIGS. 6A and 6B. Since the relationship of the balls 323b and 323c thereto is the same, only the ball 323a will be described herein. FIG. 6A is a schematic sectional view of the ball 323a at the plane substantially passing the ball center in parallel with the optical axis; and FIG. 6B is a schematic view of the ball 323a and its vicinity viewed from the front lens. Arranging the metallic plate 322a in the recess 321a provided in the shift base 321 forms a space 327a. The ball 323a is arranged within the space 327a shown in FIG. 6A so as to abut the internal bottom surface 322a1 of the metallic plate 322a. The movement of the ball 323a is restricted by four surfaces formed of internal sides 322a2 and 322a3 of the metallic plate 322a and internal walls 321a1 and 321a2 of the shift base 321.

The ball 323a is displaced in the state abutting the surface 322a1 of the metallic plate 322a and the abutment surface 312a of the metallic plate 312 within the range defined by the surfaces 322a2, 322a3, 321a1, and 321a2. The ball 323a, the metallic plate 322a, the metallic plate 312, the surfaces 322*a*2, 322*a*3, 321*a*1, and 321*a*2, and the entire moving region of the ball constitute support guiding device configured for moving the movable unit 34 on the plane perpendicular to the optical axis. Also, the ball 323*a* is clamped between the metallic plate 322*a* and the metallic plate 312, and is rolling within the movement restriction range. Since the rolling friction herein is sufficiently smaller than the sliding friction, the ball 323*a* cannot slip on the metallic plate 322*a* and the abutment surfaces 322*a*1 and 312*a* of the metallic plate 312. Hence, the movable unit 34 moves relative to the shift base unit 32 while rolling the ball 323*a*. Since the movable unit 34 and the shift base unit 32 move relative to the center of the ball 323*a*, the displacement of the ball 323*a* relative to the shift base unit 32 is the half of that of the movable unit 34.

Then, the position detecting device will be described. As mentioned above, the magnet 313*p* combines position detection with driving. A Hall element 328*p* converts the magnetic flux density into an electric signal, and is operatively connected to the FPC 326 adjacent to the image plane in the optical axial direction (e.g., by soldering or other fastening methods as known by one of ordinary skill in the relevant arts). Since the FPC 326 is fixed so as to cover the surface adjacent to the front lens in the optical axial direction of the coil 324*p* fixed by pressing, the Hall element 328*p* is arranged inside the coil 324*p*. When the movable unit 34 and the third lens group L3 are driven, the change in magnetic flux density of the magnet 313*p* is detected by the Hall element 328*p* so as to output an electrical signal. On the basis of the electric signal from the Hall element 328*p*, a control circuit (below mentioned and numeral 37 of FIG. 11) can detect positions of the movable unit 34 and the third lens group L3.

Since the respective boundaries of the bipolarized magnet in the pitch and yaw directions can be arranged perpendicularly to its detection direction, the position of the movable unit 34 can be detected biaxial independently. Like in the exemplary embodiment, by one magnet combining position detection with driving, the sensor magnet included in the position detecting device can be eliminated, reducing the thickness of the entire shift unit 3 in the optical axial direction.

Then, the positional relationship between the light-amount adjustment unit 7 and the shift unit 3 will be described with reference again to FIGS. 1 and 5. A space 333 is surrounded with the lens holder 331*a* of the first shift barrel 331, the second shift barrel 332, and the connection part 331*b* between the first second shift barrels 331 and 332. The length of the space 333 in the optical axial direction is slightly larger than that of the light-amount adjustment unit 7 between the press strip 701 and the ND bottom board 707. The light-amount adjustment unit 7 is adjacent to the bottom of the movable unit 34 in the pitch moving direction viewed from the front lens.

Then, the assembling method of the light-amount adjustment unit 7 will be described. The light-amount adjustment unit 7 is inserted into the space 333 in a direction perpendicular to the optical axis from the bottom of the shift unit in the pitch direction and is fixed to the shift unit 3 with a screw 708. In such a manner, the light-amount adjustment unit 7 is inserted into the space 333 of the shift unit 3 from the rear, and is fixed to the shift unit 3 with the screw. By doing so, the performance evaluation of the shift unit 3 can be easily executed as a single article before the assembling of the light-amount adjustment unit 7 as well as the assemble operation of the light-amount adjustment unit 7 is easy.

Then, guiding device of the L-shaped shaft 302 will be described with reference again to FIGS. 3 and 4. Concave support parts 321*g* and 321*h* are provided in the shift base; and support parts 331*c* and 331*d* provided in the first shift barrel 331 support the L-shaped shaft 302 adjacent to the image plane in the optical axial yaw direction. By the sliding of the L-shaped shaft 302 relative to the support parts 321*g* and 321*h*, the movable unit 34 moves in the yaw direction by being suppressed to rotate on the plane perpendicular to the optical axis. The entire support parts 321*g*, 321*h*, 331*c*, and 331*d* constitute a first guiding device. Support parts 321*i* and 321*j* provided in the shift base 321 determine the position of the L-shaped shaft 302 in the optical axial pitch direction; and concave support parts 311*a* and 311*b* are provided in the magnet base 311. By the sliding of the L-shaped shaft 302 relative to the support parts 311*a* and 311*b*, the movable unit 34 moves in the pitch direction by being suppressed to rotate on the plane perpendicular to the optical axis. The entire support parts 321*i*, 321*j*, 311*a*, and 311*b* constitute a second guiding device.

Figure 7:
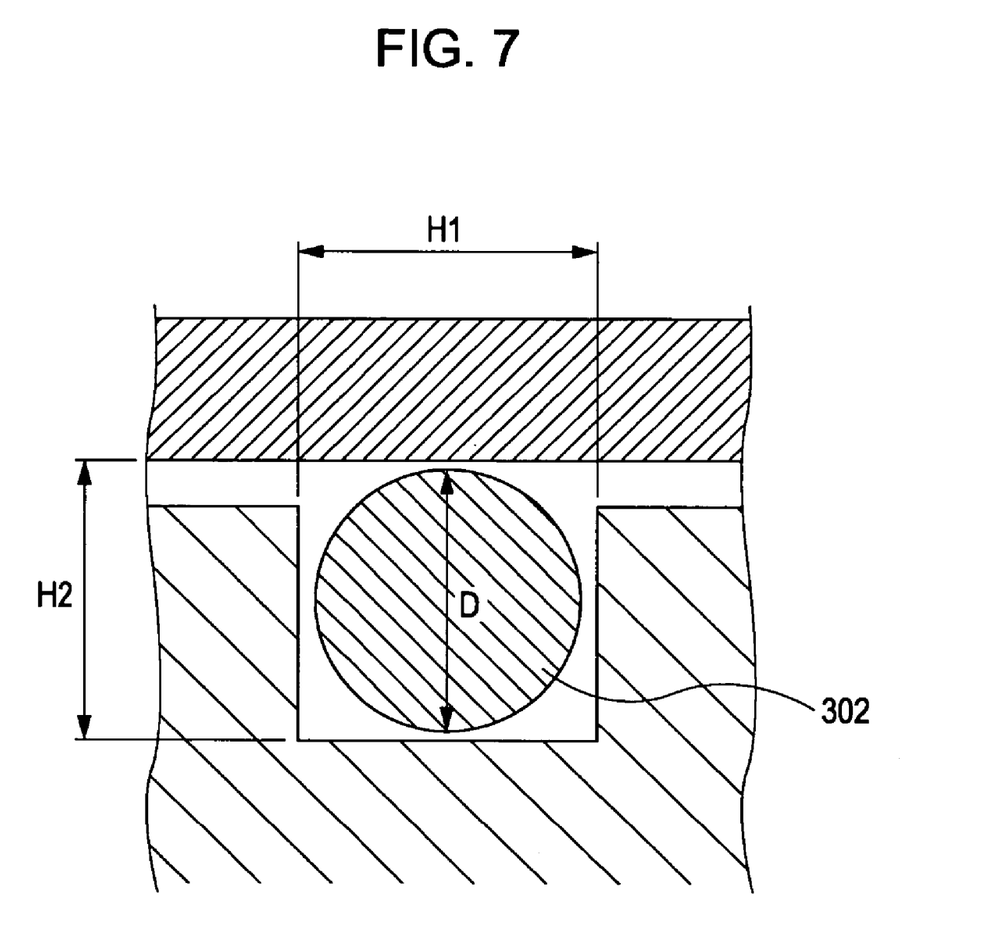
FIG. 7 is a schematic sectional view for illustrating an L-shaped shaft and its vicinity according to the first exemplary embodiment.

The dimensions of the guiding device will be described with reference to FIG. 7. FIG. 7 is a schematic sectional view of the L-shaped shaft 302 and the guiding device at a section in a direction perpendicular to the axis of the L-shaped shaft 302 for illustrating the configurations of the L-shaped shaft 302 and the guiding device in detail. The dimension D is the outer diameter of the L-shaped shaft 302; the dimension H1 is the open width in the optical axial direction of the concave portion of the support parts 311*a*, 311*b*, 321*g*, and 321*h* so as to be fitted by the L-shaped shaft 302; and the dimension H2 is the interval in the optical axial direction between the surfaces opposing each other of the support parts 311*a* and 311*b* so as to be fitted by the L-shaped shaft 302 in the similar way. Since the support parts 321*i* and 321*j* are provided in the shift base 321 forming the shift base unit 32, by the fitting of the length in the optical axial direction of the support parts 321*i* and 321*j*, the position in the optical axial direction of the L-shaped shaft 302 is determined.

On the other hand, the space between the surfaces of the support parts 311*a*, 311*b*, 331*c*, and 331*d* supporting the L-shaped shaft 302 in the optical axial direction and the L-shaped shaft 302 has slight clearances at this time. The support parts 311*a* and 311*b* and the support parts 331*c* and 331*d* can be arranged adjacent to the movable unit 34, and the position in the optical axial direction of the movable unit 34 is determined with the shift base unit 32 therebetween. This is because even when variations of tolerance in the optical axial direction are combined, the minimum allowance therefor is required. By such dimensions, the L-shaped shaft 302 can be smoothly guided in the optical axial direction as well as in the direction perpendicular to the optical axis.

Figure 8:
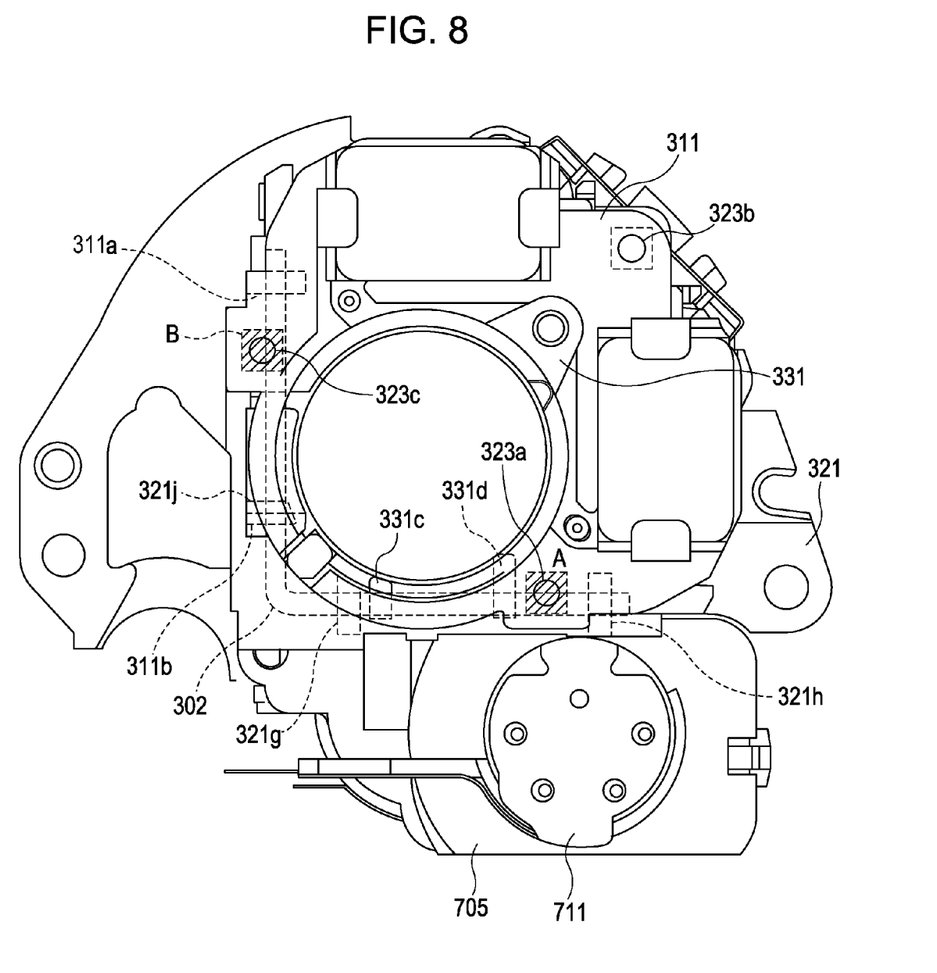
FIG. 8 is a drawing of the shift unit and the light-amount adjustment unit viewed from the front lens for illustrating the positional relationship between the L-shaped shaft and guiding device according to the first exemplary embodiment viewed from the optical axis.

Then, the positional relationship between the L-shaped shaft 302 and the guiding device viewed in the optical axial direction will be described with reference to FIG. 8. FIG. 8 is a drawing of the shift unit 3 and the light-amount adjustment unit 7 viewed from the front lens. In FIG. 8, dotted lines show the L-shaped shaft 302, the guiding device, and the support guiding device of the movable unit; oblique lines A and B represent regions occupied by the support guiding device of the movable member in the plane perpendicular to the optical axis; and some shapes are omitted. As illustrated in FIG. 8, the support guiding device of the movable member can be arranged in spaces in the pitch direction between the support parts 321*g*, 321*h*, 331*c*, and 331*d* viewed from the optical axial direction; the support guiding device B of the movable member can be arranged in spaces in the yaw direction between the support parts 321*i*, 321*j*, 311*a*, and 311*b*; thereby elongating the fitting length to the utmost. By increasing the fitting length in such a manner, the distortion angle of the L-shaped shaft 302 in the fitting clearances can be reduced to the utmost so as to guide the movable unit 34 much more precisely in the pitch and the yaw directions.

In order to elongate the fitting length without increasing the diameter of the shift unit 3, according to the embodiment, a space sufficient for the movement of the L-shaped shaft 302 is secured in the support guiding device of the movable member in the optical axial direction. Therefore, as illustrated in FIG. 8 viewed from the optical axial direction, the support guiding device A and B of the movable member and the L-shaped shaft 302 are partially overlapped with each other in the pitch and the yaw directions. Furthermore, according to the exemplary embodiment, since the light-amount adjustment unit 7 is arranged adjacent to the bottom side of the movable unit 34 in the pitch movement direction, moving the L-shaped shaft 302 in the yaw direction is effective in reducing the diameter of the lens barrel.

Figure 9A:
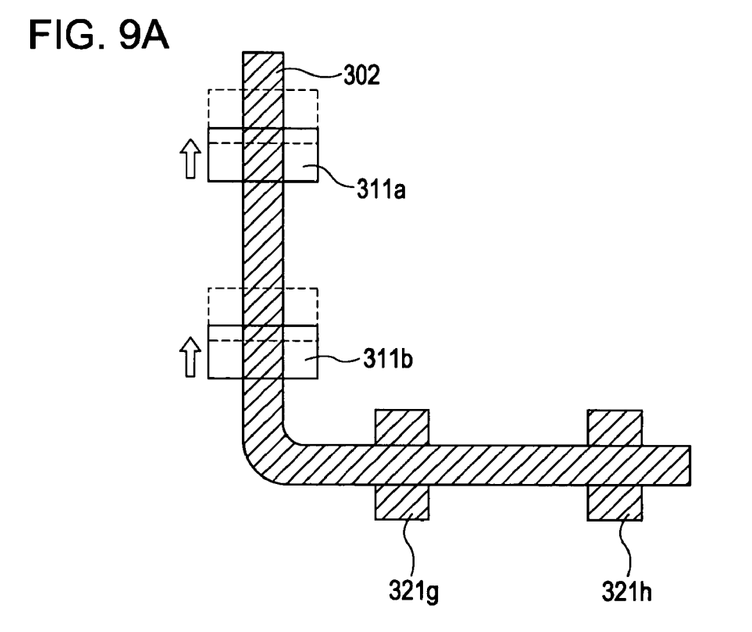
FIG. 9A is a schematic view showing the positional relationship between the L-shaped shaft and the shift unit when the movable unit is upward moved.
Figure 9B:
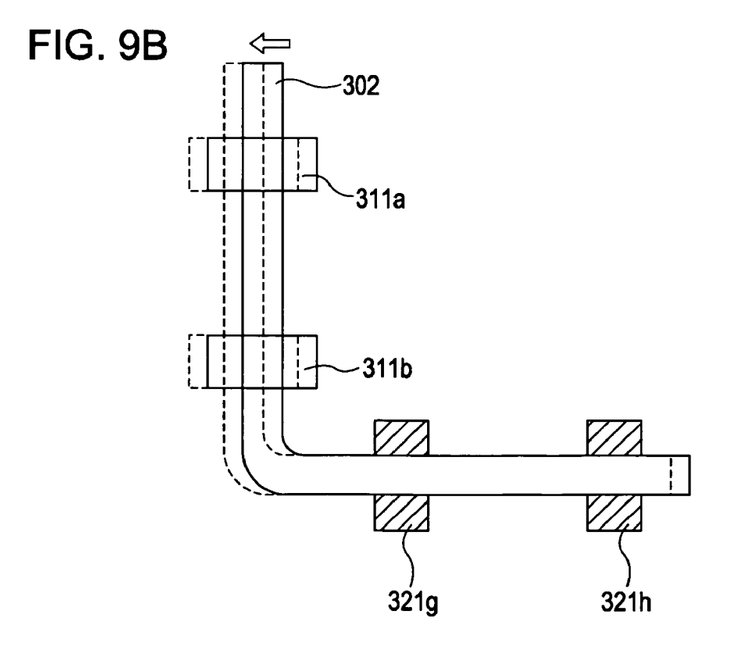
FIG. 9B is a schematic view showing the positional relationship between the L-shaped shaft and the shift unit when a movable magnet unit and the L-shaped shaft move in the left yaw direction.

Then, the movement direction of the L-shaped shaft 302 will be described in detail with reference to FIGS. 9A and 9B. FIGS. 9A and 9B are schematic views for simply illustrating the relationship between the movement of the L-shaped shaft 302 and the movable unit 34/the shift base unit 32 by showing the L-shaped shaft 302 and the support parts 311a, 311b, 321g, and 321h; FIG. 9A is a schematic view when the movable unit 34 moves in the pitch direction; and FIG. 9B is a schematic view when the L-shaped shaft 302 and the movable unit 34 move in the yaw direction. In FIGS. 9A and 9B, not moving members are shown in oblique lines. When the movable unit 34 moves in the pitch direction, the L-shaped shaft 302 only guides the movement. When the movable unit 34 moves in the yaw direction, the L-shaped shaft 302, however, moves in the yaw direction together with the movable unit 34.

According to the exemplary embodiment, the light-amount adjustment unit 7 arranged adjacent to the shift unit 3 is arranged adjacent to the bottom side of the movable unit 34 in the pitch movement direction. Hence, the L-shaped shaft 302 is moved in the yaw direction in that the light-amount adjustment unit 7 does not exist. If the L-shaped shaft 302 is assumed to move in the pitch direction, the adjacent light-amount adjustment unit 7 can be displaced outside the optical axis by the movement of the L-shaped shaft 302, increasing the diameter of the lens barrel. According to the embodiment, when the movable unit 34 moves in the pitch direction, it can move independently of the weight of the L-shaped shaft 302, the driving device for driving the movable unit 34 does not consume additional power, contributing to energy saving.

Figure 10:
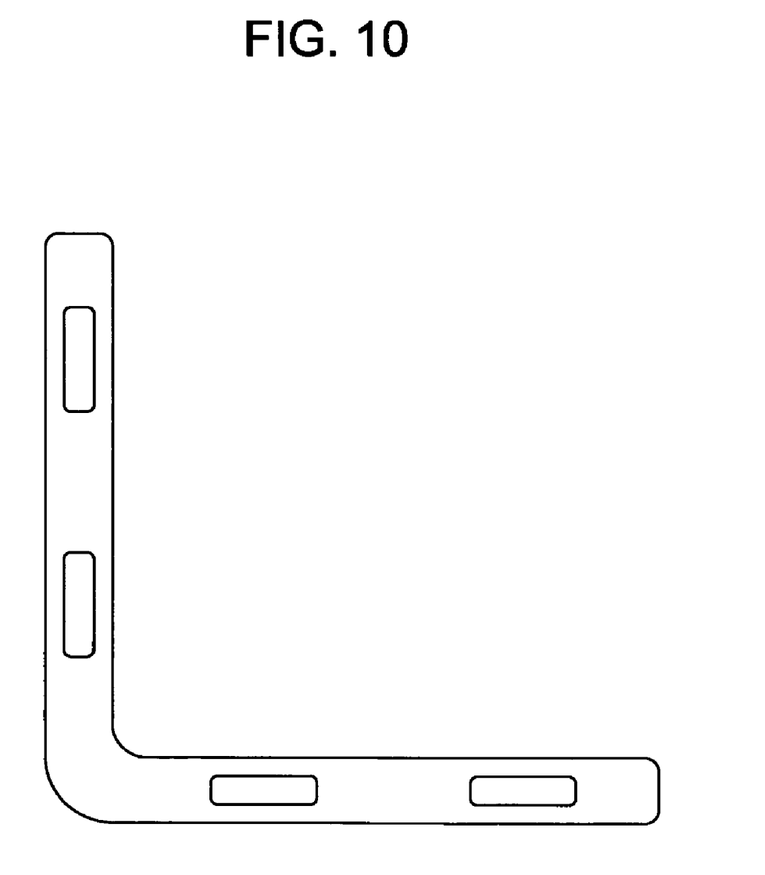
FIG. 10 is a drawing of another structure of the L-shaped shaft according to the first exemplary embodiment.

As described above, according to exemplary embodiment, the diameter of the shift unit 3 is not increased, miniaturizing the optical apparatus. The exemplary embodiment described above has exemplified the moving magnet actuator; alternatively, a moving coil actuator can be applied. Also, according to the exemplary embodiment, the two-divided movable unit has been described; however, at least one exemplary embodiment is not limited to this. According to the exemplary embodiment, the L-shaped shaft 302 has been described as the rotation restricting device configured for restricting the movable unit from rotating about the optical axis; however, the invention is not limited to this, so that the rotation restricting device can be used, such as a plate having guide grooves shown in FIG. 10 and a pitch shaft/a yaw shaft operating independently in the pitch and the yaw directions, respectively. The support guiding device configured to the movable member can also be a guiding device including a pin radially fixed to a movable member or a fixed member and a long groove for the restriction in the optical axial direction. According to the exemplary embodiment, the mechanism in that the correction lens is moved perpendicularly to the optical axis has been described; the correction lens can be moved roughly perpendicularly. That is, the correction lens can be obviously rotated perpendicularly to the optical axis roughly to the extent not largely affecting the optical performance.

Second Exemplary Embodiment

A second exemplary embodiment describes a camera with a lens barrel, which can have the image correction/reduction system according to the first exemplary embodiment.

Figure 11:
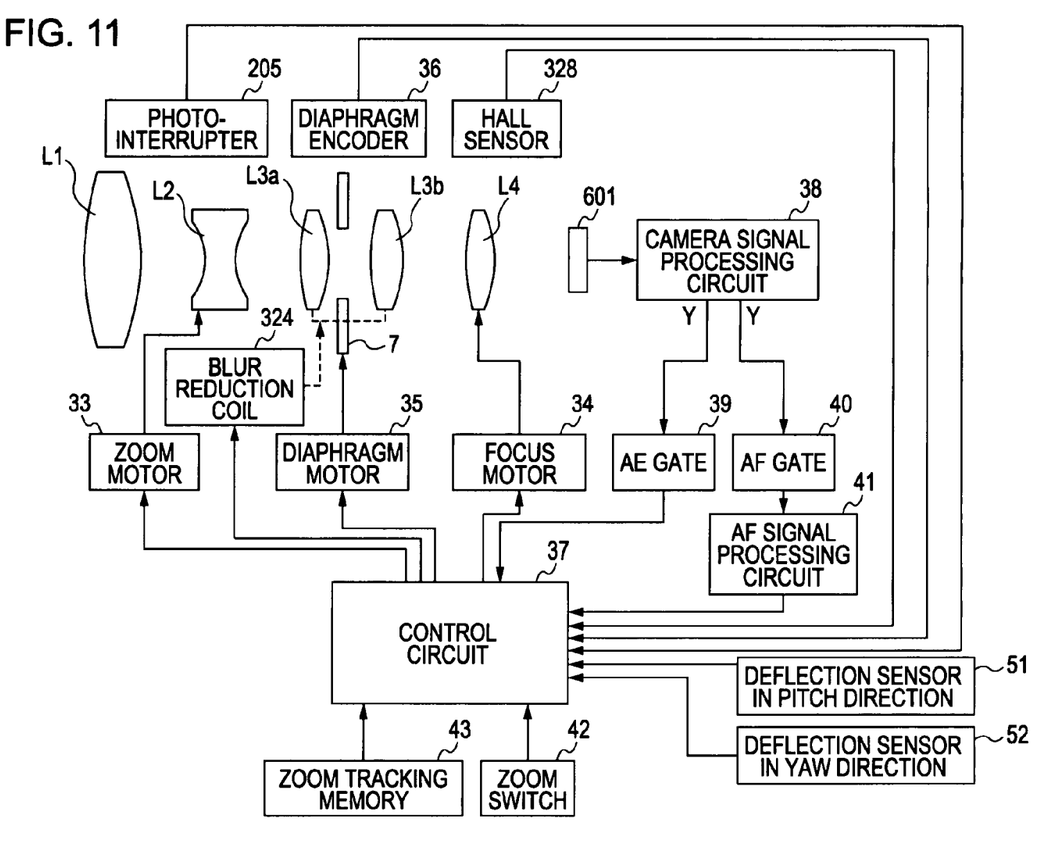
FIG. 11 is a block diagram of an electric circuit of a camera, which can have a lens barrel capable of correcting or reducing image-blur according to a second exemplary embodiment.

FIG. 11 is a block diagram of an electric circuit of the camera. Referring to FIG. 11, a zoom motor 33 is a drive power source of the second lens group L2; a voice coil motor with a coil 34 is a drive power source of the fourth lens group L4; a diaphragm motor 35 is a drive power source of the light-amount adjustment unit 7, using a stepping motor, a photo-interrupter 205 is a zoom reset switch for detecting the reference position of the second lens group L2, which detects the movement of the second lens group L2 in the optical axial direction (the relative position to the reference position) by continuously counting the number of pulse signals entering the zoom motor 33 after detecting the reference position of the second lens group L2; reference numeral 36 denotes a diaphragm encoder; a control circuit 37 includes a CPU for controlling the camera; and a camera signal processing circuit 38 performs signal processing, such as predetermined amplification and gamma correction, on the output from the image-pickup element 601. The contrast signal of the picture signal subjected to such processing is fed to an AE gate 39 and an AF gate 40. The AE gate 39 and the AF gate 40 establish optimum signal sorting ranges for the exposure control and for the focusing in picture signals of the entire picture planes, respectively. The size of the gate can be variable or a plurality of gates can be provided.

An AF signal processing circuit 41 processing an AF signal for AF (auto-focusing) produces one or a plurality of outputs related to the high-frequency component of the picture signal; reference numeral 42 denotes a zoom switch; and numeral 43 denotes a zoom tracking memory. The zoom tracking memory 43 can store the positional information of the focusing lens (the fourth lens group L4) during variation corresponding to the object distance and the position of the variator (the second lens group L2). A memory in the control circuit 37 can also be used as the zoom tracking memory. Upon operating the zoom switch 42, the control circuit 37 controls driving the zoom motor 33 and the focus motor 34 so that the predetermined positional relationship is maintained between the second lens group L2 and the fourth lens group L4 on the basis of the information of the zoom tracking memory 43. During auto-focusing, the control circuit 37 controls driving the voice coil motor so that the output of the AF signal processing circuit 41 shows a peak. Also, the control circuit 37 controls driving the diaphragm motor 35 using the average output of the Y signal passing through the AE gate 39 as a reference so that the output of the diaphragm encoder 35 corresponds to the reference. Deflection sensors 51 and 52 detect the angular change of a vibrating gyroscope in the pitch and the yaw directions, respectively. the control circuit 37 drives the third lens group L3 by controlling the electrification to the blur reduction coil 324 on the basis of the outputs from the deflection sensors 51 and 52 and the signal from the hall sensor 328.

According to the exemplary embodiment described above, an image-pickup apparatus is exemplified in which a lens barrel is provided integrally with a camera body. However, the lens barrel according to at least one exemplary embodiment can also be applied to an interchangeable lens device in that the lens barrel is detachably provided in the camera body, a photographic camera for 35 mm film, a digital still camera, and a video camera. Moreover, it can also be applied to an observation optical apparatus such as a binocular glass, which can have a vibration isolating function.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-178819 filed Jun. 20, 2005, which is hereby incorporated by reference herein in its entirety.

What is claimed is:

1. An image-blur correction system for correcting image blur by moving a movable member, having a correction lens, in a direction perpendicular to the optical axis relative to a base member, the image-blur correction system comprising:
    a support guiding member having three restriction parts for restricting the movement of the movable member in the optical axial direction so as to guide the movable member in a direction perpendicular to the optical axis;
    a rotation restricting member for restricting the rotation of the movable member;
    a first guide member arranged in the base member for guiding the rotation restricting member relative to the base member in a first direction perpendicular to the optical axis; and
    a second guide member arranged in the movable member for guiding the movable member relative to the rotation restricting member in a second direction different from the first direction and perpendicular to the optical axis,
    wherein each of the three restriction parts includes a ball retained within a concave space formed on a surface of the base member between the surfaces opposing each other of the movable member and the base member, and
    the first guide member includes two concave support parts provided in the base member and at least a first one of the three restriction parts is arranged between the two concave support parts of the first guide member when viewed from the optical axial direction, and
    the second guide member includes at least two concave support parts provided in the movable member and at least a second one of the three restriction parts is arranged between the two concave support parts of the second guide member when viewed from the optical axial direction, and
    the rotation restricting member consists of an L-shaped member that is bent by approximately 90 degrees, one side of the L-shaped member is supported by the two concave support parts of the first guide member, and another side of the L-shaped member is supported by the two concave support parts of the second guide member, such that part of the rotation restricting member overlaps two restriction parts of the three restriction parts when viewed from the optical axial direction.

2. The system according to claim 1, wherein the first direction is perpendicular to the second direction.

3. A lens barrel comprising:
a barrel, wherein the barrel is configured to hold lens; and
the image-blur correction system according to claim 1.

4. An optical apparatus comprising:
an image pickup element; and
the image-blur correction system according to claim 1.

* * * * *